(12) United States Patent
Mooring

(10) Patent No.: US 10,061,606 B2
(45) Date of Patent: *Aug. 28, 2018

(54) SYSTEMS AND METHODS OF SECURE DOMAIN ISOLATION INVOLVING SEPARATION KERNEL FEATURES

(71) Applicant: Lynx Software Technologies, Inc., San Jose, CA (US)

(72) Inventor: Edward T. Mooring, Santa Clara, CA (US)

(73) Assignee: Lynx Software Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,089

(22) Filed: Feb. 9, 2017

(65) Prior Publication Data

US 2017/0220373 A1 Aug. 3, 2017

Related U.S. Application Data

(63) Continuation of application No. 14/694,985, filed on Apr. 23, 2015, now Pat. No. 9,575,824, which is a
(Continued)

(51) Int. Cl.
*G06F 9/455* (2018.01)
*G06F 21/53* (2013.01)
(Continued)

(52) U.S. Cl.
CPC ...... *G06F 9/45558* (2013.01); *G06F 9/45545* (2013.01); *G06F 9/545* (2013.01);
(Continued)

(58) Field of Classification Search
CPC .. G06F 9/45558; G06F 9/45545; G06F 9/545; G06F 13/1673; G06F 13/4282; G06F 13/385; G06F 21/53
See application file for complete search history.

(56) References Cited

U.S. PATENT DOCUMENTS 6,049,316 A 4/2000 Nolan et al.
6,075,938 A * 6/2000 Bugnion ................. G06F 9/544
703/27

(Continued)

FOREIGN PATENT DOCUMENTS

RU 2259582 C2 8/2005
WO WO 2010/021631 A1 2/2010

OTHER PUBLICATIONS

Zhang et al., "Performance Analysis Towards a KVM-Based Embedded Real-Time Virtualization Architecture", Dec. 2010, 5th International Conference on Computer Sciences and Convergence Information Technology, pp. 421-426 (Year: 2010).*

(Continued)

*Primary Examiner* — Kenneth W Chang
(74) *Attorney, Agent, or Firm* — Knobbe, Martens Olson & Bear LLP

(57) ABSTRACT

Systems and methods are disclosed for providing secure information processing. In one exemplary implementation, there is provided a method of secure domain isolation. Moreover, the method may include configuring a computing component with data/programming associated with address swapping and/or establishing isolation between domains or virtual machines, processing information such as instructions from an input device while keeping the domains or virtual machines separate, and/or performing navigating and/or other processing among the domains or virtual machines as a function of the data/programming and/or information, wherein secure isolation between the domains or virtual machines is maintained.

20 Claims, 8 Drawing Sheets

Related U.S. Application Data continuation of application No. 13/576,155, filed as application No. PCT/US2012/042330 on Jun. 13, 2012, now Pat. No. 9,129,123.

(60) Provisional application No. 61/496,514, filed on Jun. 13, 2011.

(51) Int. Cl.
*G06F 9/54* (2006.01)
*G06F 13/16* (2006.01)
*G06F 13/38* (2006.01)
*G06F 13/42* (2006.01)

(52) U.S. Cl.
CPC ........ *G06F 13/1673* (2013.01); *G06F 13/385* (2013.01); *G06F 13/4282* (2013.01); *G06F 21/53* (2013.01); *G06F 2009/45579* (2013.01); *G06F 2009/45583* (2013.01); *G06F 2009/45587* (2013.01)

(56) References Cited

U.S. PATENT DOCUMENTS

| | | | |
|---|---|---|---|
| 7,035,963 | B2 | 4/2006 | Neiger et al. |
| 7,853,744 | B2* | 12/2010 | Mahalingam ......... G06F 9/4812 710/262 |
| 8,073,990 | B1 | 12/2011 | Baron et al. |
| 8,200,796 | B1 | 6/2012 | Margulis |
| 8,458,697 | B2 | 6/2013 | Amano et al. |
| 2004/0174352 | A1 | 9/2004 | Wang |
| 2004/0177264 | A1 | 9/2004 | Anson |
| 2004/0221009 | A1 | 11/2004 | Cook et al. |
| 2005/0105608 | A1 | 5/2005 | Coleman et al. |
| 2005/0210158 | A1 | 9/2005 | Cowperthwaite |
| 2005/0223238 | A1 | 10/2005 | Schmid et al. |
| 2007/0057957 | A1 | 3/2007 | Wooten |
| 2007/0089111 | A1 | 4/2007 | Robinson et al. |
| 2008/0127336 | A1 | 5/2008 | Sun et al. |
| 2008/0215770 | A1 | 9/2008 | Liu et al. |
| 2008/0263659 | A1 | 10/2008 | Alme |
| 2008/0282117 | A1 | 11/2008 | Partani et al. |
| 2009/0055157 | A1* | 2/2009 | Soffer ................ G06F 15/7864 703/27 |
| 2009/0099988 | A1 | 4/2009 | Stokes et al. |
| 2009/0288167 | A1 | 11/2009 | Freericks et al. |
| 2009/0322784 | A1* | 12/2009 | Sartori ................ H04N 21/426 345/619 |
| 2010/0031325 | A1 | 2/2010 | Maigne et al. |
| 2010/0077481 | A1 | 3/2010 | Polyakov et al. |
| 2010/0162338 | A1 | 6/2010 | Makhija |
| 2010/0271379 | A1* | 10/2010 | Byford ................ G09G 5/001 345/545 |
| 2011/0126139 | A1 | 5/2011 | Jeong |
| 2011/0141124 | A1 | 6/2011 | Halls |
| 2011/0161482 | A1* | 6/2011 | Bonola ................ G06F 9/5077 709/223 |
| 2011/0317831 | A1 | 12/2011 | Passera |
| 2012/0066680 | A1 | 3/2012 | Amano et al. |

OTHER PUBLICATIONS

Extended European Search Report of EP 12802824.8, dated Nov. 27, 2014, 11 pgs.
International Preliminary Report on Patentability dated Dec. 31, 2014 (1 pg) and International Search Report and Written Opinion dated Feb. 27, 2014 (15 pgs) in related PCT application No. PCT/US2013/048014, Invitation to Pay Additional Fees in related PCT/US2013/48014, dated Jan. 3, 2014, (2 pgs.) 18 pgs. total.
International Search Report and Written Opinion for PCT/US2012/177464 dated Dec. 27, 2012, 47 pages.
International Search Report and Written Opinion for PCT/US15/31236 dated Aug. 14, 2015, 9 pgs.
International Search Report and Written Opinion for PCT/US15/31257 dated Aug. 17, 2015, 9 pgs.
International Search Report and Written Opinion for PCT/US2012/042330, dated Sep. 20, 2012, 13 pgs.
International Preliminary Report on Patentability for PCT/US2012/042330, dated Dec. 17, 2013, 8 pgs.
Iqbal et al., "An Overview of Microkernel, Hypervisor and Microvisor Virtualization Approaches for Embedded Systems," Dec. 2010, 15 pgs., http://proj.eit.lth.se/fileadmin/eit/project/142/virtApproaches.pdf.
Nishimura et al., VC-1: a scalable graphics computer with virtual local frame buffers, Aug. 1996, Proceedings of the $23^{rd}$ annual conference on Computer graphics and interactive techniques, pp. 365-372.
Prosecution of European counterpart application No. 12802824.8 (EP2718785), including IPRP dated Dec. 17, 2013 (8pgs.), Response to Rule 161/162 Communication dated Sep. 3, 2014 (14 pgs.), Supplementary Search report and opinion dated Nov. 27, 2014 (10 pgs.), Response to Supplementary Search Report/Opinion dated Jun. 26, 2015 (23 pgs.), 2nd Supplemental Office Action dated Oct. 8, 2015 (6 pgs.), and Response to the 2nd Supplemental Office Action dated Apr. 18, 2016 (11 pgs.); 72 pages total.
Qingsong et al., Dual OS Support Peripheral Device Encapsulation, Oct. 2008, Fifth IEEE International Symposium on Embedded Computing, pp. 67-72 (6 pages).
Vesa Bios Extension (VBE) Core Functions Standard Version 3.0, Sep. 16, 1998, XP055153755, Retrieved from Internet: URL: http://www.petesqbsite.com/sections/tutorials/tuts/vbea/pdf (96 pgs.).

* cited by examiner

SYSTEMS AND METHODS OF SECURE DOMAIN ISOLATION INVOLVING SEPARATION KERNEL FEATURES

CROSS-REFERENCE TO RELATED APPLICATION(S) INFORMATION

This is a continuation of application Ser. No. 14/694,985, filed Apr. 23, 2015, now U.S. Pat. No. 9,575,824, which is a continuation of application Ser. No. 13/576,155, filed Dec. 12, 2013, published as US2014/0208442A1, now U.S. Pat. No. 9,129,123, which is a 371 National Phase claiming priority of international application PCT/US12/42330, filed Jun. 13, 2012, published as WO2012/177464, and is based on and claims priority/benefit of provisional patent application No. 61/496,514, filed Jun. 13, 2011, all of which are incorporated herein by reference in entirety.

BACKGROUND

Field

The innovations herein pertain to computer virtualization, computer security and/or data isolation.

Description of Related Information

Separation kernels/hypervisors have been used to provide secure isolation between multiple instances of guest operating systems running within a single computer system. Memory and CPU usage are strictly isolated, and mechanisms exist for sharing storage devices. However, sharing of the keyboard, mouse, and especially the video display has been a problem. Assigning separate physical devices to separate guests is impractical in many instances, for example, laptop computer systems have only a single display and keyboard. Previous approaches to the problem have used networked display protocols such as Remote Desktop Protocol or VNC connected via virtual network interfaces to a separate guest OS instance that contains the server for the remote display protocol and actually owns the mouse, keyboard, and video. These approaches do not provide isolation of display data, since all data is displayed by a single application in the remote server.

Consistent with certain aspects of the present disclosure, systems and methods herein may include innovations such as aspects wherein the memory used for display data is part of the virtual machine itself and is therefore isolated from access by other virtual machines by the hardware protection mechanisms of the computer system and the information flow control policies implemented in the Separation Kernel Hypervisor.

BRIEF DESCRIPTION OF THE DRAWINGS

The accompanying drawings, which constitute a part of this specification, illustrate various implementations and features of the present innovations and, together with the description, explain aspects of the inventions herein. In the drawings.

DETAILED DESCRIPTION OF ILLUSTRATIVE IMPLEMENTATIONS

Figure 1:
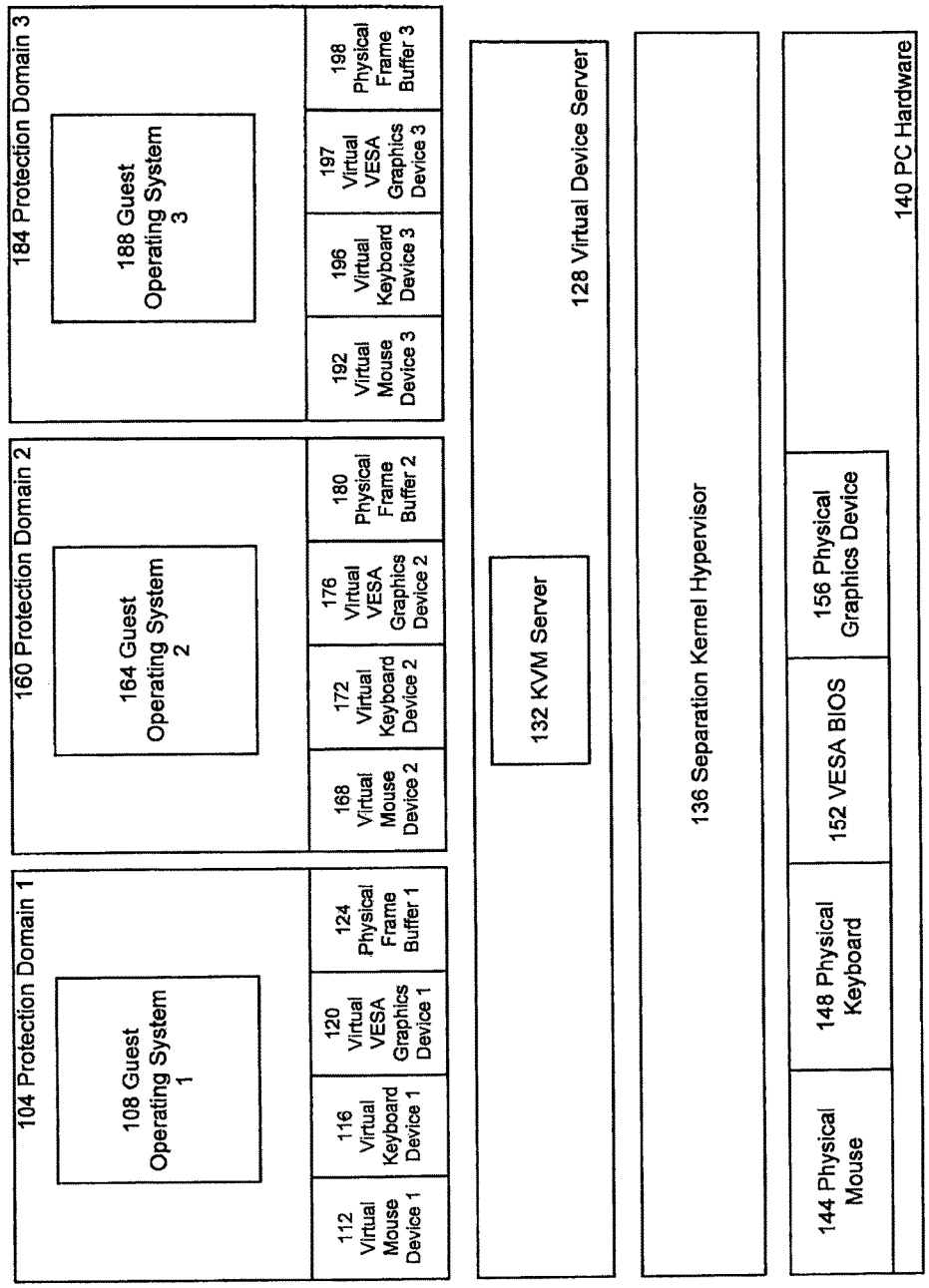
FIG. 1 is a block diagram illustrating an exemplary system and Keyboard-Video-Mouse ("KVM") architecture consistent with certain aspects related to the innovations herein.

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present innovations. Wherever possible, the same reference numbers will be used throughout the drawings to refer to the same or like parts.

Systems, methods and other computer-implemented inventions herein may include or enable a KVM (Keyboard Video Mouse) switch for secure domain display isolation in a separation kernel. Consistent with certain implementations, a software KVM (Keyboard Video Mouse) may be utilized to provide secure isolation between guest virtual machines of the video display, mouse and keyboard of a personal computer running a Separation Kernel Hypervisor. Further, according to certain embodiments, various systems and methods herein do not rely on any modifications or additions to the guest operating systems in the virtual machines. In some embodiments, aspects of the present implementations may include or involve virtualized keyboard, video, and mouse devices provided to each guest operating system, as well as a processing module or server running in a separate virtual machine.

In accordance with certain implementations, an exemplary software Keyboard/Video/Mouse switch may include one or more of the following features or subcomponents: (i) A standard PC with a keyboard, mouse, display and a graphics controller that supports the VESA BIOS extensions; (ii) A Separation Kernel Hypervisor that ensures the isolation of multiple guest Operating Systems each in its own Virtual Machine (VM); (iii) A Separation Kernel Hypervisor which is capable of assigning physical memory address ranges exclusively to individual virtual machines; (iv) A Separation Kernel Hypervisor which is capable of assigning I/O devices exclusively to individual virtual machines; (v) Two or more client VMs (virtual machines) which will share access to the physical mouse, keyboard, and graphics controller; (vi) A virtual keyboard device (e.g. a PS/2 or USB keyboard device) presented to each client VM; (vii) A virtual mouse device (e.g. a PS/2 or USB mouse device) presented to each client VM; (viii) A virtual graphics controller with VESA BIOS extensions to each client VM; (ix) A special Virtual Machine or processing component(s) referred to herein for sake of convenience and not limitation as the Virtual Device Server, which controls the actual keyboard and mouse; and/or (x) A server running in the Virtual Device Server in (viii), which communicates with the virtual devices in (v), (vi), and (vii), and which is referred to herein as the "KVM Server". Additionally, with regard to (iii) and (iv), exemplary mechanisms that may be utilized for offline configuration of these features are set forth in the Configuring Virtual Devices section, below.

In some implementations, the Virtual Device Server may includes a hosted Keyboard Video Mouse (KVM) server which has sole access and control of the physical keyboard and pointer (e.g. mouse, trackball, trackpad, joystick, etc.) input devices via the Separation Kernel Hypervisor.

Further, the frame buffer memory of the graphics controller may be divided into regions of appropriate size for the desired video resolution. In some implementations, each memory region may be assigned to one of the virtual machines that will share the display.

According to certain basic implementations, when the computer is booted, the keyboard, mouse, and video may be assigned to the Virtual Device Server. Further, the KVM Server in the Virtual Device Server may initialize the graphics controller using the VESA BIOS extensions, and sets the graphics controller's frame buffer to point to an initial guest virtual machine's frame buffer memory region. Here, then, the KVM server may open the keyboard and mouse devices, and initialize them.

Subsequently, in various implementations herein, the virtualization layer within each guest VM that is sharing the display may be presented with a virtual mouse device, a virtual keyboard device, and a virtual graphics controller with VESA BIOS extensions with a frame buffer address pointing to the section of the actual frame buffer which has been assigned to it.

Keyboard and mouse input from the user may then be received by the KVM server and sent to the corresponding virtual device in the currently-selected client VM. Outputs to the keyboard (for example, turning the Caps Lock indicator on or off) from the client VM is captured by the virtual keyboard driver and sent to the KVM server, which may be configured to communicate such information to the physical keyboard.

Additionally, calls to the virtual VESA BIOS in the selected client VM may be communicated to the KVM server, which performs the requested action, if allowed, and communicates any results back to the client VM.

Systems and methods herein may be configured to employ or utilize certain functionality in reply to pre-assigned or set key combinations. In some exemplary implementations, if the user presses a specified key combination (for example Ctl-Alt-F1), the KVM server may intercept such instruction and, rather than passing the data to the current client VM, change the current client VM to the next VM in sequence. Here, for example, the KVM server may route the mouse and keyboard data to the next VM in sequence, and read from it to get keyboard commands. Innovations relating to use of the VESA BIOS extensions may also be included. For example, such extensions may be used to set the start of the frame buffer for the graphics controller to point to the frame buffer memory region for that client VM.

In general, systems and methods are disclosed herein for providing secure information processing. In one exemplary implementation, there is provided a method of secure domain isolation. Moreover, the method may include configuring a computing component to establish isolation between domains or virtual machines, processing information such as instructions from an input device while keeping the domains or virtual machines separate, and/or performing navigating and/or other processing among the domains or virtual machines as a function of the data/programming and/or information, wherein secure isolation between the domains or virtual machines is maintained.

Various systems and methods herein may be implemented via VESA BIOS Extensions (such as those referred to above) providing a mechanism for software-driven display start and address swapping (e.g., function 4F07h, etc.) via multiple protection domains. More generally, some of the present systems and methods involve innovations related to taking address swapping originally intended for use in software-driven animation and stereoscopic displays to implemented secure isolation of video display data, e.g., as belonging to multiple protection domains. Features herein allow software to change the start address of the frame buffer the graphics hardware is currently displaying. Aspects of the present innovations use such mechanisms, sometimes in conjunction with the protections provided by the PC hardware and the separation kernel, to provide secure separation of display data between different protection domains. Only code running within the Protection Domain to which that frame buffer is assigned can access the data.

With regard to such extension innovations, one illustrative mechanism that may be utilized by the KVM Server 132 is based on the Function 07h Set/Get Display Start features using only specific sub functions of the VESA BIO functions used for display switching. FIG. 1 shows an example architecture for the Software KVM with three guest operating systems sharing the display, mouse, and keyboard. Referring to FIG. 1, Protection Domain #1 104 is the domain for the first guest operating system. The Separation Kernel Hypervisor 136 enforces isolation between this and the other protection domains on the system. Communication between this protection domain and the KVM Server 132 is allowed.

As shown in FIG. 1, Guest Operating System #1 108 may contain or process the code and data for the guest operating system in Protection Domain #1. Further, System 108 may be presented with a virtual PC hardware environment by the Separation Kernel Hypervisor 136, which controls the Guest Operating System's actual access to memory and CPU resources. Also, Virtual Mouse Device #1 112 may present Guest Operating System #108 with a virtualized hardware interface identical to a standard PS/2 or USB mouse.

In some implementations, Virtual Keyboard Device #1 116 may present Guest Operating System #1 108 with a virtualized hardware interface identical to a standard PS/2 or USB keyboard.

Additionally, Virtual VESA Graphics Device #1 120 may present Guest Operating System #1 108 with a virtualized hardware interface identical to a VESA compliant graphics controller. And Physical Frame Buffer #1 124 may present Guest Operating System #1 108 with a memory area in the Physical Graphics Device 156 frame buffer to use to display its data. Such memory allocation may be presented to Guest Operating System #1 by Virtual VESA Graphics Device #1 120 as a complete VESA frame buffer.

According to some implementations, Virtual Device Server 128 may be a server platform running in a separate protection domain which is used to host device virtualization servers such as the KVM Server 132. Here, for example, it may have sole access to the Physical Mouse 144, Physical Keyboard 148 and VESA BIOS 152 via the Separation Kernel Hypervisor's 136 protection mechanisms.

Further, the KVM Server 132 may be a server application running within the Virtual Device Server 128 which takes input from the Physical Mouse 144 and Physical Keyboard 148 and routes them to the selected Guest Operating System 104, 160, or 184. In some implementations, the KVM server 132 may use the VESA BIOS 152 to select which Physical Frame Buffer 124, 180, or 198 will be displayed by the Physical Graphics Device 156.

As set forth in embodiments herein, the Separation Kernel Hypervisor 136 may provide the underlying hardware virtualization support to run multiple guest operating systems and provide the isolation between protection domains as well as communication mechanisms to support allowed communications between domains, e.g. between the Virtual Keyboard Devices 116, 172, and 196 and the KVM Server 132. Referring to FIG. 1, PC Hardware 140 may be a standard desktop or laptop form factor PC with a VESA compliant graphics controller, though the innovations pertain to other computing components beyond this or other illustrative components shown in the drawings. Further, while Physical Mouse 144 may be a standard USB or PS/2 mouse and Physical Keyboard 148 may be a standard USB or PS/2 keyboard, other input/output devices are within the ambit of the innovations herein.

In the illustrative implementation shown in FIG. 1, VESA BIOS 152 may be the BIOS provided by the VESA compliant Physical Graphics Device 156. Here, for example, it may be used by the KVM Server 132 to initialize the Physical Graphics Device and change which Physical Frame Buffer 124, 180 or 198 is displayed by the Physical Graphics Device. Physical Graphics Device 156 is a PC graphics controller capable of presenting a VESA compliant hardware interface.

Lastly, in FIG. 1, the entities within Protection Domains #2 and #3 160, 164, 168, 172, 176 and 180 and 184, 188, 192, 197 and 198 may be similar to those described above for Protection Domain #1 104.

Figure 2:
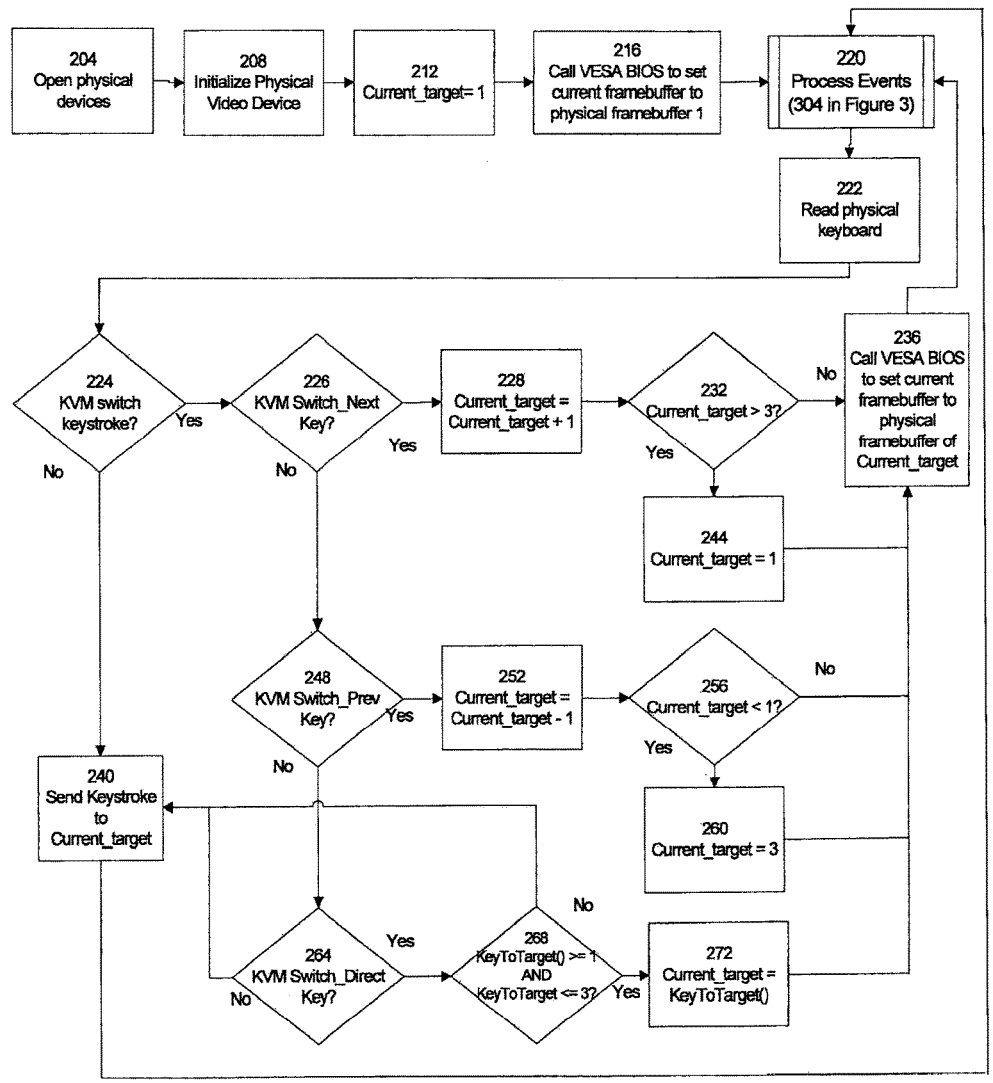
FIG. 2 is a flow chart showing an exemplary implementation of certain KVM Physical Server Keyboard Input Execution processing consistent with certain aspects related to the innovations herein.

FIG. 2 is a flow chart showing an exemplary implementation of certain KVM Physical Server Keyboard Input Execution processing consistent with certain aspects related to the innovations herein. Referring to FIG. 2, a flow chart illustrating the execution of the Software KVM Server's Physical Keyboard input handling is shown. Various innovations herein include or utilize aspects of FIG. 2, such as implementations involving features that provide for the secure switching of the physically partitioned Physical Frame Buffers. While this flow chart illustrates operation(s) consistent with the system and example architecture described in FIG. 1, the processing here and elsewhere in this disclosure is not limited to the specific (illustrative) features and elements depicted in FIG. 1. Among other things, additional architectures with different numbers of Guest Operating Systems and their associated Protection Domains are certainly possible by simply extending or reducing the current, illustrative examples.

Figure 3:
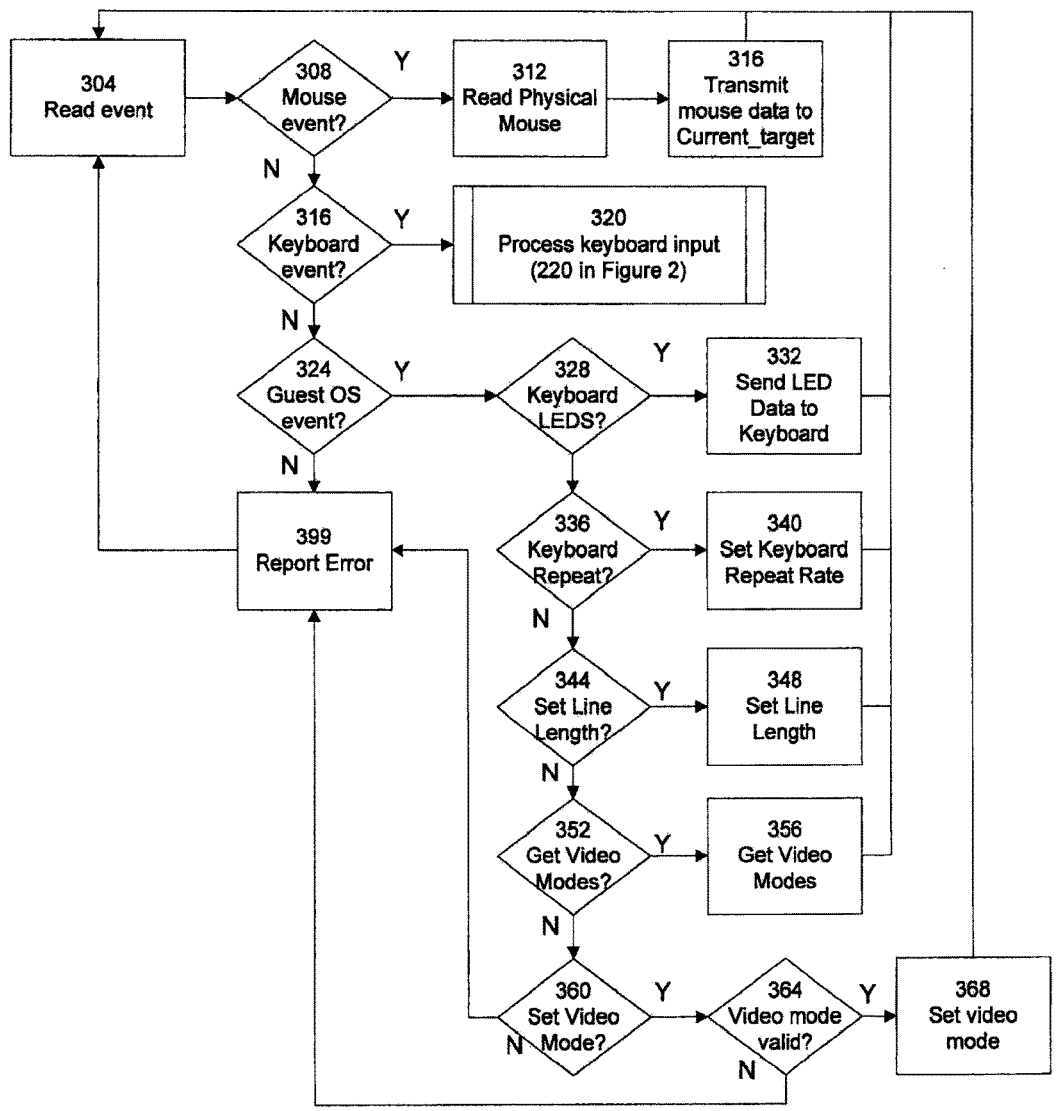
FIG. 3 is a flow chart showing an exemplary implementation of certain KVM Event Handler processing consistent with certain aspects related to the innovations herein.

As shown in FIG. 2, at 204, initial execution of the server may commence, such as opening the physical devices (Physical Mouse 144, Physical Keyboard 148, and Physical Graphics Device 156). At 208, initialization of the Physical Device(s) 156 may be performed. Then, at 212, the current target Domain may be set (e.g., the Protection Domain to which keyboard and mouse input is sent and whose frame buffer is currently displayed on the Physical Graphics Device), here shown being set to Protection Domain #1 104. At 216, a VESA BIOS call may be performed to set the address which the Physical Graphics Device will use as its frame buffer to the address of Physical Frame Buffer #1 124. Next, at 220, processing of input events of several kinds may be performed. Some illustrative detailed implementations of such processing is shown in FIG. 3 and described in connection therewith.

After such event processing, at 222, input from an input device such as keystroke(s) from a Physical Keyboard 148 may be read. Note that such keystroke data from the Physical Keyboard contains not only the key that was pressed (e.g. 'FI') but also any modifier keys (control, shift, alt, etc.) that were also pressed.

In another step, at 224, a determination may be made as to whether the keystroke has the pre-configured KVM switch modifiers (e.g. control-shift). If the keystroke does not contain any such modifiers, processing proceeds to step 240. If it does include a modifier, processing proceeds to step 226. At 240, the keystroke data is transmitted to the appropriate Virtual Keyboard Device 116, 172, or 196 depending on the current target, and then resets processing back to the event processing step, 220, to repeat the event loop. When a relevant modifier is detected, a determination is made, at 226, as to whether the key pressed is the pre-configured KVM Switch Next key (e.g. right-arrow). If a Switch Next is detected, processing proceeds to 228. If not, processing proceeds to 248.

When a Switch Next is detected, processing proceeds through steps 228 and 232 to set the current target protection domain to the next higher numbered domain (i.e. from Protection Domain #1 104 to Protection Domain #2 106, from Protection Domain #2 160 to Protection Domain #3 184, etc. In a case where just three domains exist and the current target was Protection Domain #3 184, the selected domain may revert back to Protection Domain #1 104; here, such reversion occurring at 244. In this way, repeatedly pressing the KVM Switch Next Key will cause the Software KVM to cycle the display, keyboard and mice between the three protection domains. Upon completion of such domain transfer function(s), processing may proceed, e.g., to another VESA BIOS call, at 236.

Turning back to detection of a Switch Next instruction, at 226, if it is determined that the keystroke is not a Switch Next instruction, processing proceeds to step 248. At 248, a determination is made as to whether the key pressed is the pre-configured KVM Switch Previous key (e.g. left-arrow). If a Switch Previous is detected, processing may proceed to step 252. If not, processing may proceed to step 264.

When a Switch Previous is detected, processing proceeds through steps 252 and 256 to set the current target protection domain to the next lower numbered domain (i.e. from Protection Domain #2 160 to Protection Domain #1 104, from Protection Domain #3 to Protection Domain #2, etc. In the case where just three domains exist and the current target was Protection Domain #1 104, the domain would be set to Protection Domain #3 184, at 260. In this way, repeatedly pressing the KVM Switch Previous Key will cause the Software KVM to cycle the display, keyboard and mice between the three protection domains. Once the cycle instruction is completed, processing may proceed to step 236, explained below.

If the keystroke is neither a Switch Next nor a Switch Previous instruction, a determination may be made, at 264, as to whether the keystroke is one of the pre-configured KVM Switch Direct keys (e.g. FI through F3). Here, for example, systems and methods herein may be configured with such keystrokes that trigger a switch to a specified target domain rather than cycling to the next or previous domain. Further, the mapping between keys and protection domains, here, may be pre-configured in the KVM server. If no such Switch Direct instruction is detected, processing may proceed, at 240, to send the keystroke to the current target. However, If it is, it transfers control to element 268.

At 268, a determination is made as to whether the target mapped to the key is in range (i.e. between 1 and 3). If it is out of range, processing proceeds to step 240 to send the keystroke to the current target. If it is within the specified range, the target protection domain is set, at 272, to the domain identified/mapped via the Switch Direct command. Once the domain is set, processing proceeds to 236.

At step 236, a call to the VESA BIOS is made to set the address that will be used by the Physical Graphics Device as its framebuffer to the appropriate Physical Frame Buffer (Physical Frame Buffer #1 124, Physical Frame Buffer #2 180, or Physical Frame Buffer #3 198) according to the current target Protection Domain. In some implementations, in step 236, the current video mode and line length may also be set to the values stored for the current target Protection domain. Upon completion of such functionality, processing may then return to 220 to repeat the event loop.

FIG. 3 is a flow chart showing an exemplary implementation of certain KVM Event Handler processing consistent with certain aspects related to the innovations herein. Referring to FIG. 3, illustrative flow of control for the Software KVM handling input events from various possible sources is shown, namely in this illustration from the three sources: the Physical Mouse 144, the Physical Keyboard 148 and the Guest Operating Systems 108, 164, and 188. TO begin, at 304, an event is read/received for processing.

In another step, at 308, a determination is made as to whether the event is a mouse event; if it is a mouse event, mouse data is read, at 312, from the Physical Mouse 144. Next, at 316, transmission of the mouse data to the appropriate Virtual Mouse Device occurs, e.g., to Virtual Mouse Device #1 112, Virtual Mouse Device #2 168, or Virtual Mouse Device #3 192, depending on the current target. Upon completion, processing then proceeds back to step 304 to await the next event. Additionally, at 316, a determination is made as to whether the event is a keyboard event. If it is a keyboard event, then processing proceeds, at 320, to step 220 in FIG. 2, where exemplary handling of such keyboard events is set forth in more detail.

In further processing, at 324, a determination is made as to whether the event came from one of the Guest Operating Systems (Guest Operating System #108, Guest Operating System #2 164, or Guest Operating System #3 188). If so, additional processing is performed to determine the type of the event. Otherwise an error is reported, at 399, and processing proceeds back to 304 to repeat the event loop.

In a first type of Guest OS event processing, at 328, a determination is made as to whether the event is a command for the LEDs on the Physical Keyboard. If so, the LED data is sent to the Physical Keyboard, at 332, processing then returns to element 304 to repeat the event loop. If the event is not such keyboard LED command, processing may proceed to step 336.

In a second type of Guest OS event processing, at 336, a determination is made as to whether the event is a command to set the keyboard repeat rate. If so, the keyboard repeat rate is set, at 340, for the Physical Keyboard, and then processing may proceed to 304 to repeat the event loop. If the event is not such keyboard repeat command, processing may proceed to step 344.

In a third type of Guest OS event processing, at 344, a determination is made as to whether the command is to set the display's line length. If so, the line length is set, at 348. For example, here at 348, the line length for the originating Guest Operating System may be stored unless that Guest Operating System is the current target. If it is, then (also at 348) the line length may be changed in the Physical Graphics Device, as well. Otherwise, the line length will be changed in element 236 of FIG. 2, when the originating Guest Operating System becomes the current target. In either case, processing may then proceed to step 304 to repeat the event loop. If the event is not such a line length command, processing may proceed to step 352.

In a fourth type of Guest OS event processing, at 352, a determination is made as to whether the event is a command to get the supported video modes. If so, those video modes are returned to the requesting Guest Operating System, at 356, and then processing proceeds to step 304 to repeat the event loop. If the event is not such a get video mode command, processing may proceed to step 360.

In a fifth type of Guest OS event processing, at 360, a determination is made as to whether the event is a command to set the video mode. If so, the chosen mode is checked for validity, at 364. If the mode is not valid, then an error is reported at 399 and processing proceeds to 304 to repeat the event loop. If the mode is valid, then the mode is set in step 368. Here, at 368, the requested video mode for the originating Guest Operating System is stored unless that Guest Operating System is the current target. If it is, then the video mode in the Physical Graphics Device is changed at 368 as well. Otherwise, the video mode may be changed in element 236 of FIG. 2, e.g., when the originating Guest Operating System becomes the current target. In either case, processing then proceeds to 304 to repeat the event loop. If the event is not such a set video mode command, then an error is reported at 399 and processing proceeds to 304 to repeat the event loop.

It should be noted that the various processing steps set forth in FIGS. 2 and 3, such as the Switch Next, Switch Previous and Switch Direct of FIG. 2 and the Guest OS event processing of FIG. 3, need not be performed in the particular ordering set forth herein. These details are provided for the purpose of illustration only as some or all of the various processing may certainly be implemented in different order that that shown and described in connection with the present drawings.

Figure 4A:
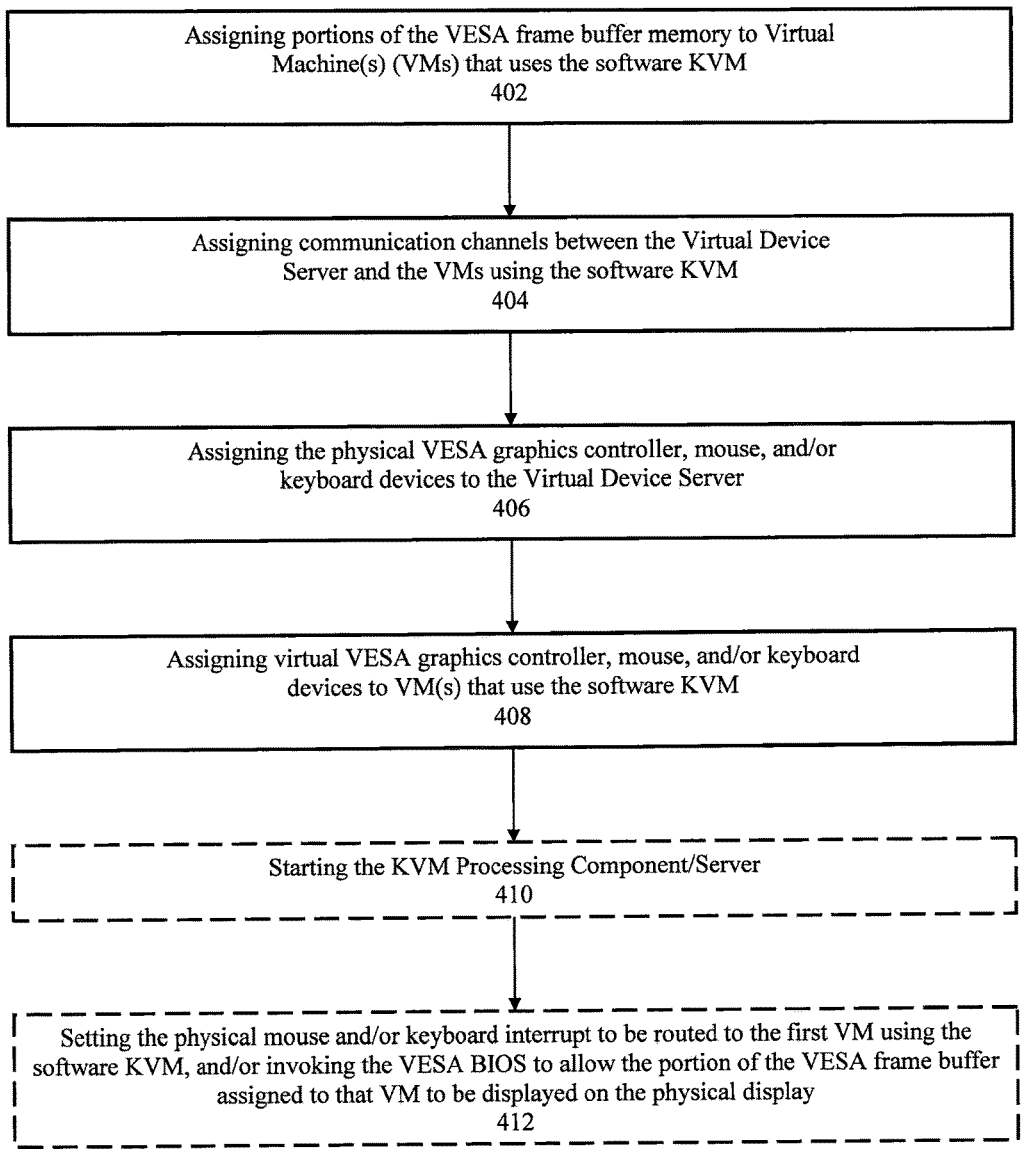
FIGS. 4A-4B are flow charts illustrating exemplary virtual machine/display functionality consistent with certain aspects related to the innovations herein.
Figure 4B:
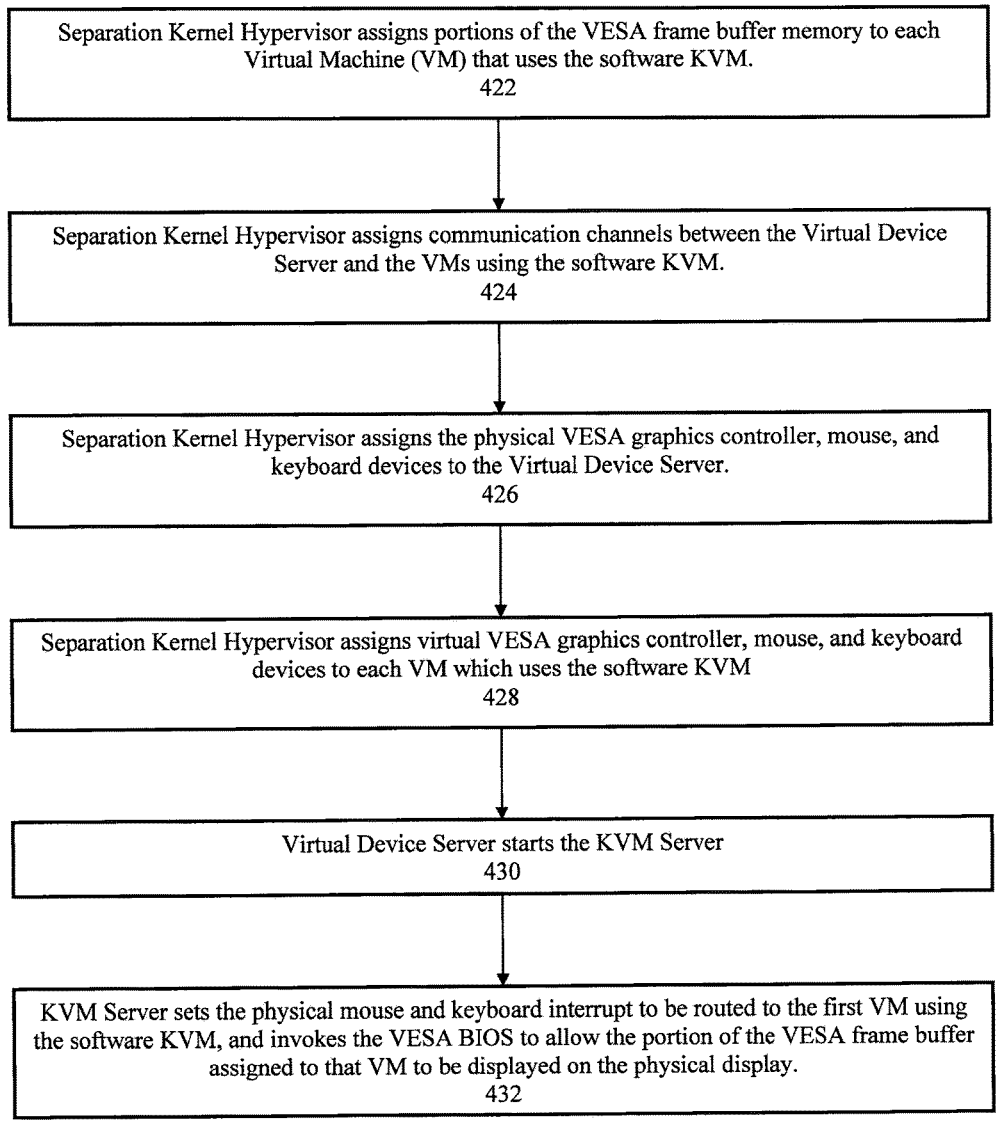

FIGS. 4A-4B are flow charts illustrating exemplary virtual machine/display functionality consistent with certain aspects related to the innovations herein. Referring to FIG. 4A, an exemplary method of computer configuration/operation associated with the present secure domain isolation is shown. Here, illustrative methods may include one or more of assigning portions of the VESA frame buffer memory to Virtual Machine(s) (VMs) that uses the software KVM 402, assigning communication channels between the Virtual Device Server and the VMs using the software KVM 404, assigning the physical VESA graphics controller, mouse, and/or keyboard devices to the Virtual Device Server 406, and assigning virtual VESA graphics controller, mouse, and/or keyboard devices to VM(s) that use the software KVM 408. Other exemplary implementations may include steps such as starting the KVM Processing Component/Server 410, as well as setting the physical mouse and/or keyboard interrupt to be routed to the first VM using the software KVM and/or invoking the VESA BIOS to allow the portion of the VESA frame buffer assigned to that VM to be displayed on the physical display 412.

FIG. 4B is a flow chart illustrating a more specific example of virtual machine/display functionality consistent with certain aspects related to the innovations herein. At the start of this exemplary functionality, at 422, the Separation Kernel Hypervisor assigns portions of the VESA frame buffer memory to each Virtual Machine, e.g., using the software KVM. Then, at 424, the Separation Kernel Hypervisor assigns communication channels between the Virtual Device Server and the Virtual machines using the software KVM. In the next step, at 426, the physical VESA graphics controller, mouse, and keyboard devices are assigned to the Virtual Device Server. Next, at 428, the Separation Kernel Hypervisor makes a similar assignment for the virtual VESA graphics controller, mouse and keyboard devices to each Virtual Machine that uses the software KVM. Following this, at 430, the KVM Server is initiated by the Virtual Device Server. Finally, at 432, the KVM Server sets the physical mouse and keyboard interrupt to be routed to the first Virtual Machine, e.g. using the software KVM, and uses the VESA BIOS to allow the portion of the VESA frame buffer assigned to that first Virtual Machine to be displayed on the physical display.

Figure 5A:
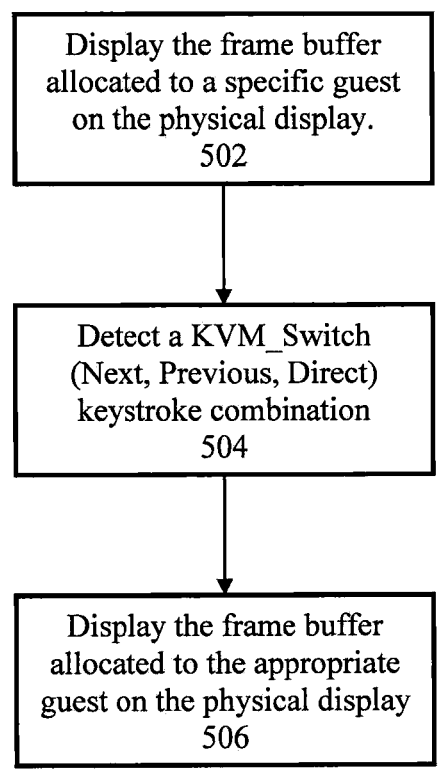
FIGS. 5A-5B are flow charts illustrating exemplary input command/guest virtual machine/display functionality consistent with certain aspects related to the innovations herein.
Figure 5B:
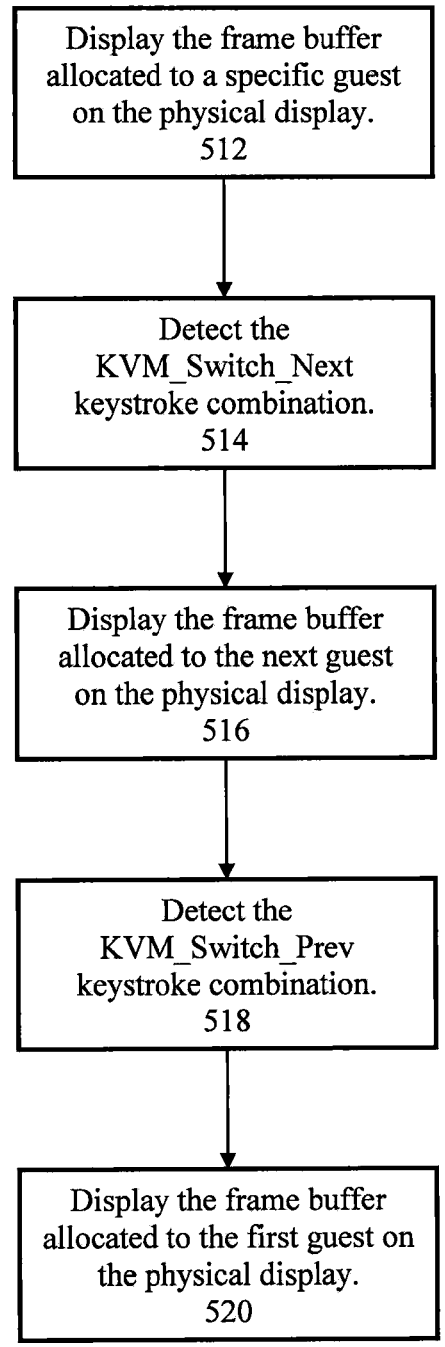

FIGS. 5A-5B are flow charts illustrating exemplary input command/guest virtual machine/display functionality consistent with certain aspects related to the innovations herein. Referring to FIG. 5A, exemplary processing involved with switching between guests on a display is shown. Here, illustrative methods may include one or more of displaying the frame buffer allocated to a specific guest on the physical display 502, performing one or more processes to detect a KVM switch keystroke combination (e.g., Switch_Next, Switch_Previous, Switch_Direct) 504, and/or displaying the frame buffer allocated to the appropriate guest on the display 506. Various specific examples of such functionality are set forth in FIGS. 2 and 3 and described otherwise herein.

FIG. 5B illustrates exemplary processing of keystroke combinations that iterate forward and backward through the guest operating system frame buffers currently displayed on the physical display. In the first step, at 512, the frame buffer that has been assigned to a specific guest operating system is projected on the physical display. Next, at 514, the specific keystroke combination designated to move to the next KVM in sequence in is detected. Once that detection has occurred, at 516, the next guest operating system frame buffer is displayed on the physical display. This process continues with the additional detection of the specific keystroke combination designated to move to the previous KVM in sequence, shown at 518. If and when this keystroke combination is detected, the physical display is set to display the frame buffer allocated to the previous guest operating system (in this example, the first guest operating system), at 520.

Figure 6:
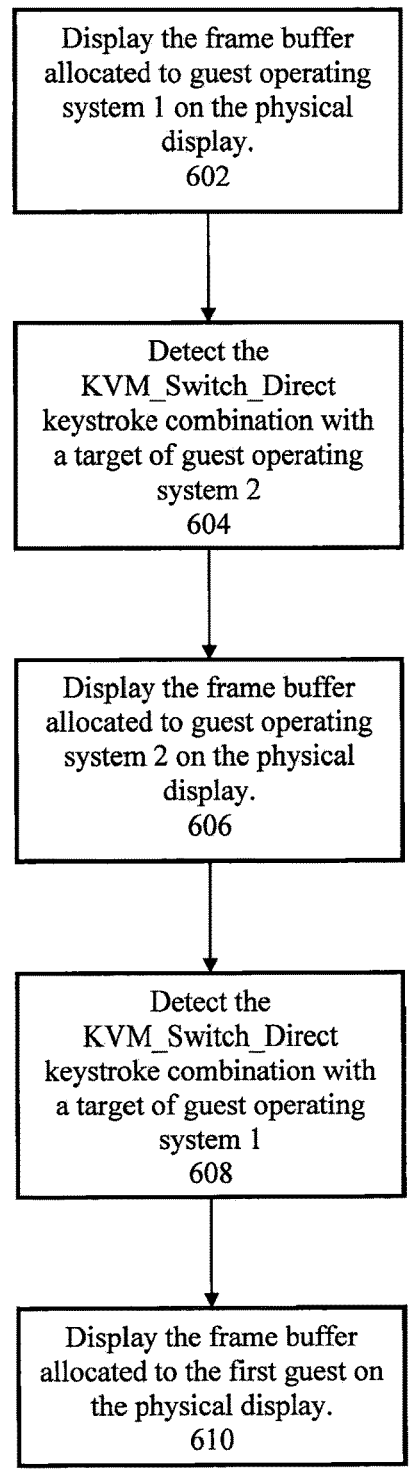
FIG. 6 is a flow chart illustrating additional exemplary input command/guest virtual machine/display functionality consistent with certain aspects related to the innovations herein.

FIG. 6 is a flow chart illustrating additional exemplary input command/guest virtual machine/display functionality consistent with certain aspects related to the innovations herein. Referring to FIG. 6, processing associated with displaying a specific guest operating system frame buffer on the physical display involving direct instruction to the various frame buffer(s) is shown. In an initial state, at 602, the frame buffer allocated to the first guest operating system is displayed on the physical display. When the specific keyboard combination targeting guest operating system 2 is detected, at 604, the physical display is set to display the frame buffer allocated to guest operating system 2, at 606. Similarly, at 608, when the specific keystroke combination targeting guest operating system 3 is detected, the frame buffer allocated to the third guest operating system is displayed on the physical display, at 610.

FIGS. 4A and 4B illustrate an initial sequence of operations that may be involved with creation of the configuration described in FIG. 1 and which may, in some implementations, enable the sequences of operations described in FIGS. 2 and 3. FIGS. 5A, 5B and 6 describe some illustrative user interaction features associated with innovations herein as described in more detail in FIGS. 2 and 3.

The present Keyboard Video Mouse (KVM) innovations, such as those implemented via the exemplary software embodiments set forth herein, may provide access to emulated PS/2 or USB keyboard and mouse devices and a video device for Fully Virtualized subjects. It also provides support for switching the keyboard, mouse and video control between the Fully Virtualized subjects, for example, in one implementation by using the Ctrl-Shift-FI-Ctrl-Shift-FIO key combination. According to some implementations, the following screen resolutions with 32 bpp may be supported: 640×480. 800×600, 1024×768 and 1280×800 and 1280× 1024 using the configuration details below. All the modes may be checked if they are supported by the video controller. Further, both PS/2 and USB keyboard mouse as physical input devices may be supported. (Such software/features may also sometimes be referred to, elsewhere or herein, as KVM—Keyboard, Video, Monitor.)

It should be noted that the quantity of subjects that can be simultaneously configured for KVM, in these illustrative implementations, may be hardware dependent and may be limited as a function of the amount of the available video RAM (e.g., in some implementations, a minimum 3 MB subject is required). Further, in order to enable support of e.g. 1280×1024 screen resolution mode the client video frame buffer size should be increased to 8 MB in the XML and -rvm.conf files.

The exemplary implementation below illustrates how to create a virtual AC97 device named AC 97 for a FV subject (windowsO) as a client and the PV Linux subject (pvlinuxO) as a server using IRQ 161 as the service interrupt number. Configuring Virtual Devices The following aspects describe how illustrative, emulated virtual devices may be configured for protection domains/subjects/guest virtual machines that are fully virtualized and/or paravirtualized.

Software KVM Switch

The Software KVM Switch emulates the keyboard and mouse devices (e.g. PS/2 or USB keyboard and mouse devices) and a VESA video device for FV subjects. It may also be configured to provide support for switching the keyboard, mouse and video control between the FV subjects using the Ctrl-Shift-FI-Ctrl-Shift-FIO key combinations.

Via such implementations, for example, 640×480, 800× 600, 1024×768 and 1280×800 screen resolutions with 32 bits per pixel may be supported. Further, devices such as PS/2 and USB keyboard/mouse are supported as physical input devices.

Configuring the XML File

1. Create the virtual KVM devices:

```
<virtual device vdevname="KVMDEVO" pname="unclassified
  partition">
    <pciaddress busnum="O" devnum="15" funcnum="O"/>
    <interface pcid="OOOOOOOO" irq="O">
        <emulatelegacy devid="00000303" irq=" 1 "/>
            <ioaccessmethod>
                <ioports baseport="0060" range=" 1 "/>
            </ioaccessmethod>
            <ioaccessmethod>
                <ioports baseport="0064" range="I "/>
            </ioaccessmethod>
        </ emulatelegacy>
        <emulatelegacy devid="OOOOOF13" irq=" 12"1>
        <emulatelegacy devid="00000900">
        <ioaccessmethod>
            <ioports baseport="03CO" range="32"1>
        </ioaccessmethod>
```

```
            <ioaccessmethod>
                <ioports baseport="03B0" range="12"1>
            </ioaccessmethod>
            <ioaccessmethod>
                <ioports baseport="0ICE" range="2"1>
            </ioaccessmethod>
        </ emulatelegacy>
    </interface>
</virtualdevice>
```

Do the same for KVMDEVI.

2. Create the video framebuffer areas:

```
<memoryregion memregionname="VIDEO FB0" pname="unclassified
partition" memorytype="BIOS" size="00400000" fill="99">
    <starthpa> E0000000</ starthpa>
</memoryregion>
<memoryregion memregionname="VIDEO FB 1" pname="unclassified
partition" memorytype="BIOS" size="00400000" fill="55">
    <starthpa> E0400000</ starthpa>
</memoryregion>
```

Note that the physical address range is configured to start from the beginning of the usable video frame buffer memory (refer to the video card vendor documentation for this information), and follow each other without gaps. The sizes depend on the desired screen resolution and must be multiple of 64K (0x10000). In some implementations, the minimum required size can be obtained as the screen area in pixels multiplied by 4 and rounded up to 64K (for the 1280×800 resolution it is 1280×800×4=0x3E8000). Further, different sizes per area may be implemented.

3. Create the KVM communication streams memory regions:

```
<memoryregion memregionname="KVM0" pname="unclassified
partition" memorytype="VDEVIO" size=" 1 000" fill="00">
    <alignment>4KByte</alignment>
</memoryregion>
<memoryregion memregionname="KVMI" pname="unclassified
partition" memorytype="VDEVIO" size=" 1 000" fill="00">
    <alignment>4KByte</alignment>
</memoryregion>
```

4. Allow windows0 to access the above devices and regions:

```
<memoryflow memregname="KVM0" guestaddr="EE800000"
readperm="ALLOW" writeperm="ALLOW"/>
<memoryflow memregname="VIDEO FB0"
guestaddr="O0OOOOOOdOOOOOOO"
readperm="ALLOW" writeperm="ALLOW"/>
<virtualdeviceflow vdevname="KVMDEVO" interface="0"/>
```

Allow windows 1 to access the above devices and regions by performing the same actions.

5. Add the respective memoryflows to the PV Linux subject (pvlinux0):

```
<memoryflow memregname="KVM0" readperm="ALLOW"
writeperm="ALLOW">
<memoryflow memregname="KVMI" readperm="ALLOW"
writeperm="ALLOW">
```

6. Add the following lines to the <subjectflow sname="windows0"> section of pvlinux0 to allow sending IRQs 1 and 12 to windows0:

```
<injectintperm irq="12" perm="ALLOW"/>
<injectintperm irq=" 1 " perm="ALLOW"/>
```

Add the same lines to the windows1 subject flow.

In addition, the windows0 and windows 1 subjects are given access to the LOWMEM and BIOS regions, and pvlinux0 must have access to the LOWMEM, BIOS, VIDEO BIOS and VGAREG regions. Also the physical VGA, keyboard and mouse devices (and USB ifusing USB keyboard/mouse) may then be assigned to pvlinux0.

Configuring PV Linux

Edit the /etc/kvm.conffile as follows:
KVM TTY=9 # tty number for the pvlinux0 keyboard
KVM MOUSE=/dev/mouse # the pvlinux0 mouse device
KVM VMODE=0xI15 # the initial video mode Add the video framebuffer area sizes counted in units of 64K to the initial parameters (initparams) of the PV Linux subject (pvlinux0): <KVM_FBSIZES=0x40:0x40> Note that the sizes must be provided in the same order as the video framebuffer areas were created and separated by ':' symbol. A default size for framebuffer, such as 4 MB, may be used if no parameter is provided.

KVM Support for Paravirtualized Lynxos-SE Subject

This example illustrates how to create a KVM configuration for PVLynxOS-SE subject(pvlosse0) using the PV Linux subject (pvlinux0) as the KVM server.

Configuring the XML File

Designate memory for the video framebuffer areas:

```
<memoryregion memregionname="VIDEO _FB0" pname="unclassified
partition" memorytype="BIOS" size="00400000" fill="99">
    <starthpa> E0000000</ starthpa>
</memoryregion>
<memoryregion memregionname="VIDEO _FB 1" pname="unclassified
partition" memorytype="BIOS" size="00400000" fill="55">
    <starthpa> E0400000</ starthpa>
</memoryregion>
```

Note that the physical address ranges are configured to start from the beginning of the usable video frame buffer memory (refer to the video card vendor documentation for this information), and follow each other without gaps. The sizes depend on the desired screen resolution and must be multiple of 64K (0xI00000). In some implementations, the minimum required size is 640×480×4 bytes (0xIE000). Further, different sizes per area may be implemented.

Create the KVM Communication streams memory region

```
<memoryregion memregionname="KVM0"
pname="unclassified partition" memorytype="VDEVIO"
size=" 1 000" fill="00">
    <alignment>4KByte</alignment>
</memoryregion>
<memoryregion memregionname="KVMI"
pname="unclassified partition" memorytype="VDEVIO"
size=" 1 000" fill="00">
    <alignment>4KByte</alignment>
</memoryregion>
```

-continued

```
Allow pvlosseO to access the above devices and regions:
<memoryflow memregname="KVMO"
readperm="ALLOW" writeperm="ALLOW"/>
<memoryflow memregname="VIDEO _FBO"
readperm="ALLOW" writeperm="ALLOW"/>
```

Add the respective memoryflows to the PV Linux subject (pvlinuxO):
<memoryflow memregname="KVMO" readperm="ALLOW" writeperm="ALLOW"/>
Add the following lines to the <subjectflow sname="pvlosseO"> section ofpvlinuxO to allow sending irq's 1 and 12 to pvlosseO:

```
<injectintperm irq="12" perm="ALLOW">
<injectintperm irq=" 1 " perm="ALLOW">
```

In addition pvlinuxO must have access to the LOWMEM, BIOS, VIDEO BIOS and VGAREG regions. Also the physical VGA, keyboard and mouse devices (and USB if using USB keyboard/mouse) must be assigned to pvlinuxO.

Configuring PV Linux

Edit the /etc/kvm.conffile as follows:
KVM TTY=9 # tty number for the pvlinuxO keyboard;
KVM MOUSE=/dev/mouse # the pvlinuxO mouse device;
KVM VMODE=Ox115 # the initial video mode.
Add the video framebuffer area sizes counted in units of 64K to the initparams of the PV Linux subject (pvlinuxO):
   <KVM_FBSIZES=Ox40:0x40>
Note that the sizes must be provided in the same order as the video framebuffer areas were created and separated by ":" symbol. The default size for framebuffer specifically 4 MB is used if no parameter is provided.
Configure PV LynxOS-SE to use the KVM feature.
Check features that kvm.cfg is enabled in the 'config.tbl' may be as follows:
I: kvm.cfg
   To configure the SKDB and kkprintfto work on KVM, set the SKDB PORT and KKPF PORT, in uparam.h as follows:
   #define SKDB PORT SKDB KVM - - -
   #define KKPF PORT SKDB KVM - - -
Check that the kvminfo.c file contains the following entry:
KVM (kvml-inf'o "KVMO", "VIDEO-FBO'")
Configure the VMO to work on /dev/kvmO and VM1 to work on /dev/kvm1 in the VCT file:
ForVMO:
CommandLine=/usr/binirunshell I dey IkvmO lusrlhinl-bash;
Std In NodeFname=/dev/kvmO;
StdOutNodeFname=/dev/kvmO;
Std ErrNodeFname=/dev/kvmO;
ForVMI
CommandLine=/usr/binirunshell I dey Ikvm 1 lusrlhinl-bash;
StdInNodeFname=/dev/kvml;
StdOutNodeFname=/dev/kvml;
StdErrNodeFname=/dev/kvml;
Build the net.img
cd $IENV_PREFIX)/sys
make clobber install
cd $ (ENV PREFIX)/bsp.x86 pc
make clean install netkdi The innovations herein may be implemented via one or more computing components, one or more servers, other components, or distributed between such elements. When implemented as an appliance, such an appliance may comprise either components such as a general-purpose CPU, RAM, etc. found in general-purpose computers, or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., circuitry, computing/processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: various software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise", "comprising", and the like are to be construed in an inclusive sense as opposed to an exclusive or exhaustive sense; that is to say, in a sense of "including, but not limited to". Words using the singular or plural number also include the plural or singular number respectively. Additionally, the words "herein", "hereunder", "above", "below", and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains (e.g., experienced kernel programmers) that variations and modifications of the various implementations shown and described herein may be made without departing from the spirit and scope of the invention. Accordingly, it is intended that the invention be limited only to the extent required by the applicable rules of law.

What is claimed is:
1. A method of securely processing information, the method comprising:
configuring one or more computing components associated with video frame buffer management such that isolation between domains or virtual machines is establish as a function of presenting, to each operating system associated with each of the domains or virtual machines, a physical frame buffer as a memory area in a physical graphics device frame buffer to display data on a physical graphics device;
isolating one or more physical frame buffers via resource isolation features of a separation kernel hypervisor such that secure isolation between the domains or virtual machines is maintained;
assigning, via a separation kernel hypervisor, portions of frame buffer memory to each virtual machine;
creating, via the separation kernel hypervisor, communication channels between a virtual device server and each virtual machine;

assigning, via the separation kernel hypervisor, a physical graphics controller and one or more physical input devices to the virtual device server;

assigning, via the separation kernel hypervisor, a virtual graphics controller and one or more virtual input devices to the virtual device server;

initializing a keyboard video mouse server;

routing, via a software keyboard video mouse, one or more interrupts for the physical input device or devices to one of the virtual machines;

displaying the frame buffer that is associated with one of the virtual machines on a physical display.

2. The method of claim 1 wherein the frame buffer memory includes VESA frame buffer memory, the physical graphics controller includes a VESA graphics controller, the virtual graphics controller includes a VESA graphics controller, and display of at least one of the virtual machines on the physical display is performed by invoking the VESA BIOS.

3. The method of claim 1 wherein the physical input devices include one or more of a mouse and/or a keyboard.

4. The method of claim 1 wherein the routing of the physical input device interrupts is set by the keyboard video mouse server.

5. The method of claim 1 wherein the video frame buffer management involves functionality utilized to implemented secure isolation of video display data belonging to multiple protection domains.

6. A method of selecting information associated with virtual machines that interact with a hypervisor with regard to information displayed on a physical display, the method comprising:

configuring one or more computing components associated with video frame buffer management such that isolation between domains or virtual machines is establish as a function of presenting, to each operating system associated with each of the domains or virtual machines, a physical frame buffer as a memory area in a physical graphics device frame buffer to display data on a physical graphics device;

isolating one or more physical frame buffers via resource isolation features of a separation kernel hypervisor such that secure isolation between the domains or virtual machines is maintained;

displaying a frame buffer associated with a specific guest operating system on the physical display;

designating a specific combination of keystrokes to indicate a switch to the next virtual machine in sequence;

designating a specific combination of inputs to indicate a switch to the previous virtual machine in sequence;

detecting the inputs associated with switching to the next virtual machine in sequence, and displaying the frame buffer associated with the guest operating system associated with the next virtual machine in sequence;

detecting the inputs associated with switching to the previous virtual machine in sequence, and displaying the frame buffer associated with the guest operating system associated with the previous virtual machine in sequence.

7. The method of claim 6 further comprising:

utilizing video frame buffer management, which was originally provided for a different use, to implement secure isolation features.

8. The method of claim 7 wherein the video frame buffer management uses video frame buffer management functionality originally provided in software-driven animation and/or stereoscopic display.

9. The method of claim 7 wherein the video frame buffer management involves functionality utilized to implemented secure isolation of video display data.

10. The method of claim 7 wherein the video frame buffer management involves functionality utilized to implement secure isolation of video display data belonging to multiple protection domains.

11. The method of claim 6 further comprising:

changing a start address of a frame buffer associated with information the graphics device is displaying.

12. The method of claim 6 further comprising:

performing processing in conjunction with a separation kernel to provide secure separation of display data between different protection domains.

13. The method of claim 6 wherein the specific combination of inputs includes a combination of keystrokes on a keyboard.

14. The method of claim 6 wherein a KVM server receives input from a physical input device and routes the input to the respective operating system.

15. The method of claim 6 wherein a VESA BIOS component selects which physical frame buffer to display on the physical graphics device.

16. The method of claim 6 wherein the guest operating systems operate inside respective protection domains.

17. The method claim 6 further comprising processing information, via KVM server, including:

initializing a graphics controller using Video Electronics System Administration (VESA) Basic Input Output System (BIOS) extensions;

setting the graphic controller's frame buffer to point to an initial guest virtual machine's frame buffer memory region; and initializing the input devices.

18. The method of claim 6 wherein the operating systems are virtual machines.

19. The method of claim 6 wherein the virtual graphics controller includes a frame buffer address pointing to a section of an assigned actual frame buffer.

20. The method of claim 6 wherein the video frame buffer management involves functionality utilized to implemented secure isolation of video display data belonging to multiple protection domains.

* * * * *